United States Patent [19]

Goatman

[11] Patent Number: 4,868,875
[45] Date of Patent: Sep. 19, 1989

[54] TELEPHONE HOUSING SECTION ASSEMBLED FROM A PLURALITY OF IDENTICAL SUBSECTIONS

[75] Inventor: Michael C. Goatman, Tetbury, Great Britain

[73] Assignee: U.S. Philips Corporation, New York, N.Y.

[21] Appl. No.: 139,090

[22] Filed: Dec. 23, 1987

Related U.S. Application Data

[63] Continuation of Ser. No. 916,922, Oct. 9, 1986, abandoned.

[30] Foreign Application Priority Data

Oct. 9, 1985 [GB] United Kingdom ................. 8524843

[51] Int. Cl.$^4$ ............................................. H04M 1/02
[52] U.S. Cl. .................................... 379/429; 379/368; 379/436
[58] Field of Search ............... 379/428, 429, 434, 440, 379/368, 267, 436; 200/5 A, 43.18, 307, 295, 296; 340/815.1, 815.14, 815.2, 365 VL; 235/145 R, 145 A

[56] References Cited

U.S. PATENT DOCUMENTS

| D. 282,740 | 2/1986 | Rood | 379/434 |
|---|---|---|---|
| 3,521,008 | 7/1970 | Tyson | 379/434 |
| 3,916,103 | 10/1975 | Morrell et al. | 379/428 |
| 3,941,951 | 3/1976 | Engstrom et al. | 379/436 |
| 4,072,840 | 2/1978 | Daigle | 200/296 |
| 4,092,527 | 5/1978 | Luecke | 340/365 VL |
| 4,284,855 | 8/1981 | Adams et al. | 379/435 |
| 4,363,942 | 12/1982 | Dees et al. | 200/5 A |
| 4,375,584 | 3/1983 | Muzumdar et al. | 379/428 |
| 4,385,212 | 5/1983 | Tyler | 379/440 |
| 4,517,420 | 5/1985 | Haskins | 379/435 |
| 4,581,495 | 4/1986 | Geri et al. | 379/419 X |

FOREIGN PATENT DOCUMENTS 1223889 9/1966 Fed. Rep. of Germany .
7901998 3/1979 Netherlands ......................... 200/295

OTHER PUBLICATIONS

Jansen, "KT20 Multi-function Telephone Terminals", Philips Telecomm. Review, vol. 40, No. 4, Dec. 1982, pp. 327-336.
Hansbauer et al., "Modular Telephone User Equipment Line", Telefon Report 9, Mar. 1973, pp. 73-83.
"Keyboard", Tolman and Vaughan, *Western Electric Technical Digest*, No. 67, Jul. 1982, pp. 23, 24.
"The Teleconnect Guide to Which Phone System Should I Buy?", The Telecom. Library, Inc., 1985, 23 pages.

*Primary Examiner*—Thomas W. Brown
*Attorney, Agent, or Firm*—Algy Tamoshunas; Leroy Eason

[57] ABSTRACT

A telephone instrument housing constructed from a first section (1) and a second section (2), the first. The second section (2) comprises three identical first sub-sections (4,5,6) which are substantially rectangular in plan. The number of first sub-sections is dependent on the dimensions of the first section (1) which is formed in one piece. The first sub-sections (4,5,6) comprise a first part defining a regular array of apertures (22, FIG. 2) suitable for locating an array of pushbuttons (8). The array of apertures (22) extends across the full width of the rectangle so that when two or more subsections are butted together a continuous regular array of apertures extends across the arrangement of first subsections. A cover plate (9) covers locations in which no pushbutton is provided, the cover plate being located by the apertures (22). The first sub-sections also comprise a second part defining a single aperture (14) which extends over a major portion of the second part. A further sub-assembly (11) is mounted in the aperture (14) in the second part of one or more first sub-sections.

10 Claims, 5 Drawing Sheets

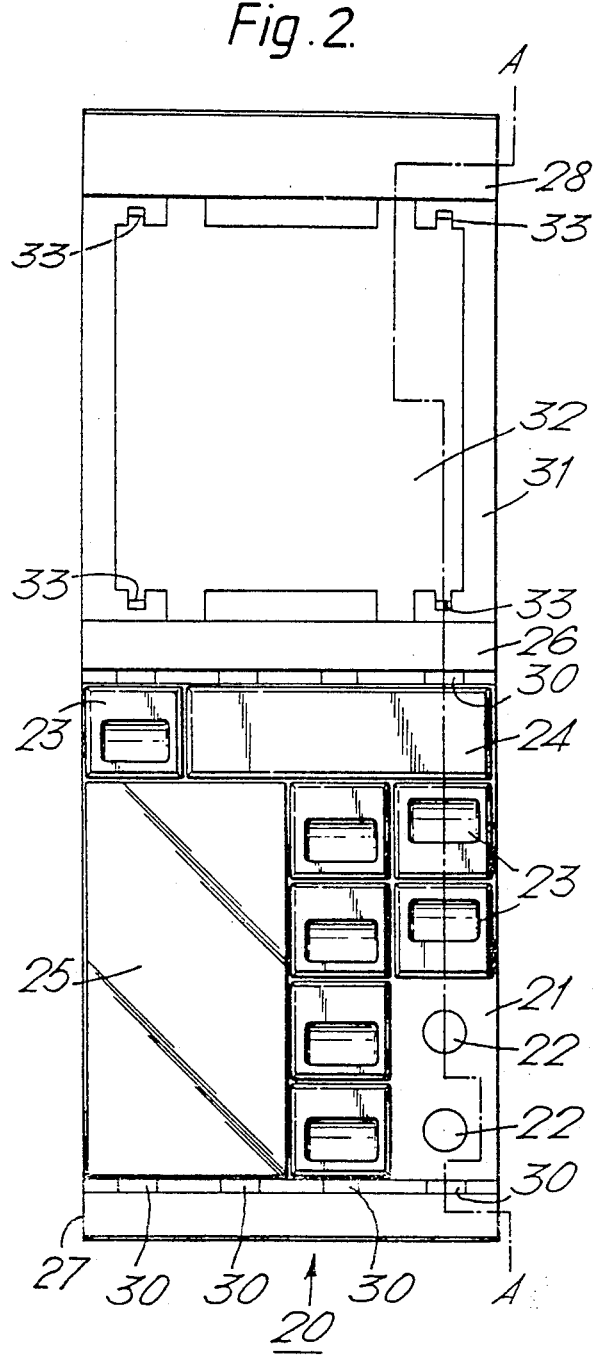
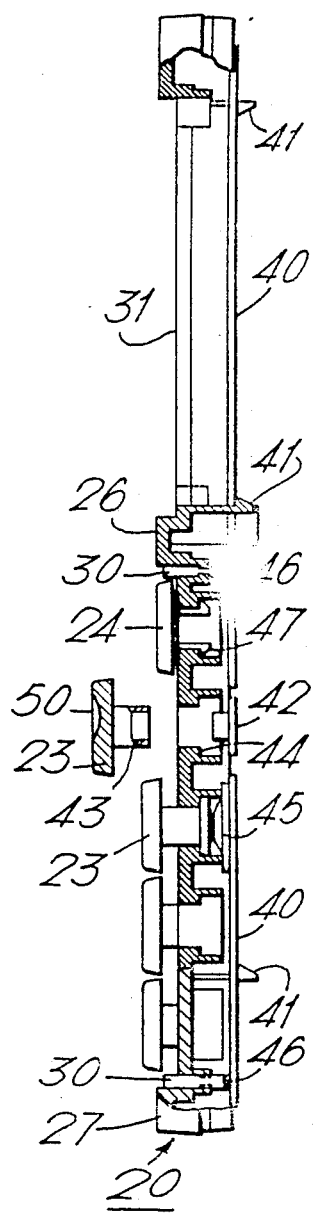

TELEPHONE HOUSING SECTION ASSEMBLED FROM A PLURALITY OF IDENTICAL SUBSECTIONS

This is a continuation of application Serial No. 916,922, filed Oct. 9, 1986, now abandoned.

BACKGROUND OF THE INVENTION

1. Field of the Invention

The invention relates to a telephone instrument housing constructed from a first section and a second section, the first and second section being connected together to form a housing, the second section comprising a plurality of identical first sub-sections which are substantially rectangular in plan, the number of first subsections being dependent on the dimensions of the first section which is formed in one piece.

2. Description of the Related Art

Telephone instrument housing are commonly constructed from a base section and a top section (base and top referring to a table top rather than wall mounted instrument). Typically the base section has items such as a tone caller mounted within it and the top section carries push buttons and perhaps a visual display and supports the handset.

There is a trend towards adding further facilities to telephone instruments, such as visual displays, repertory diallers, loudspeaking or "hands free" operation, and data transmission. Thus a family of instruments which may have a selection of these facilities may be required. This brings the problem of how to allow for the different facilities to be provided in the most economic fashion. Clearly the different instruments will require different sized housings, dependent on the number and type of facilities provided. Since the housings of the instruments are normally plastic mouldings a variety of different mouldings are required. This greatly increases the tooling costs for a range of instruments, particularly since the various options offered tends to reduce the quantity of any individual instrument type required.

A telephone instrument housing such as set forth in the opening paragraph is disclosed in applicant's co-pending applications Ser. Nos. 916,918 and 916,919 filed concurrently herewith, which application Ser. No. 916,918 issued on Sept. 20, 1988 as U.S. Pat. 4,773,090, and which application Ser. No. 916,919 is now abandoned; and is also disclosed in German Patent No. 1223889. The telephone instrument housing of such patent is described therein as formed by a base section into which a plurlaity of modules can be plugged, the modules containing various functional arrangements which can be connected together to form a complete instrument e.g. handset module, dial module, and a module containing a recall button. In the arrangements shown in FIGS. 1 to 3 of the German Patent all the modules are different from one another. However the arrangement shown in FIG. 4 contains two types of module which are duplicated. The telephone instrument disclosed in the German Patent goes some way towards solving the problems set out hereinbefore but still lacks flexibility since changes within a module cannot easily be carried out without affecting the overall appearance.

SUMMARY OF THE INVENTION

It is an object of the invention to enable the provision of a range of telephone instrument housings without unduly increasing the number of different mouldings required.

The invention provides a telephone instrument housing as set forth in the opening paragraph characterised in that the first sub-sections comprise a first part defining a rectangular array of apertures suitable for locating an array of pushbuttons, the array of apertures extending across the full width of the rectangle so that when two or more subsections are butted together a continuous rectangular array of apertures extends across the arrangement of first subsections.

When the first section and the subsections are formed as injection moulded plastics members this enables the use of a reduced number of different mouldings with a consequent reduction in tooling costs. The first section is typically a base section of the telephone instrument and is less complex in form than the second section. Hence although a different base moulding is required for each size of instrument the tooling required for the base moulding is not so expensive as that required for the top section.

The sub-sections may comprise a first part defining a matrix of apertures suitable for locating a regular array of pushbuttons and a second part defining a single aperture which extends over a major portion of the second part.

This enables the top face of the instrument to present an appearance showing a complete block of buttons and if a pushbutton is not required in any position the appearance can be maintained merely by mounting a dummy button in that position.

A cover plate may cover locations in which no pushbutton is provided, the cover plate being located by the apertures.

Where a block of pushbuttons are not required a cover plate can be located by the apertures to give a finished decorative appearance to the telephone instrument.

The sub-sections may be mounted on a single printed circuit board. The printed circuit board provides, for example conductive tracks for a rubber mat keypad, key decoding circuitry and driving circuits for display devices. The sub-sections may be snap fitted on the printed circuit board by means of barbs on the sub-section engaging with apertures provided in the printed circuit board. This provides a structure which is sufficiently rigid for assembly and maintainance operations. In the embodiments described hereinafter further printed circuit boards for telephone and/or data facilities may be located in the base section.

A further sub-assembly may be mounted in the aperture in the second part of one or more sub-sections, which sub-assembly may be a snap fit in the aperture(s). The sub-asembly may carry further pushbuttons and/or one or more display devices.

The second section may comprise a further sub-section formed to locate a telephone handset. Such a sub-section may be used on a whole range of telephone instruments since most telephone instruments require a handset. Consequently the number of further sub-sections required will be such as to justify the production of a special mould for this sub-section.

The sub-sections may be connected to the first section by means of screws to enable the two sections to be easily separated for maintainance.

BRIEF DESCRIPTION OF THE DRAWINGS

Embodiments of the invention will now be described, by way of example, with reference to the accompanying drawings, in which:

FIG. 2 shows a plan view of a sub-section for a telephone instrument housing according to the invention, FIG. 3 is a cross-sectional elevation of the sub-section shown in FIG. 2 the section being taken on line A—A.

DESCRIPTION OF THE PREFERRED EMBODIMENTS

Figure 1:
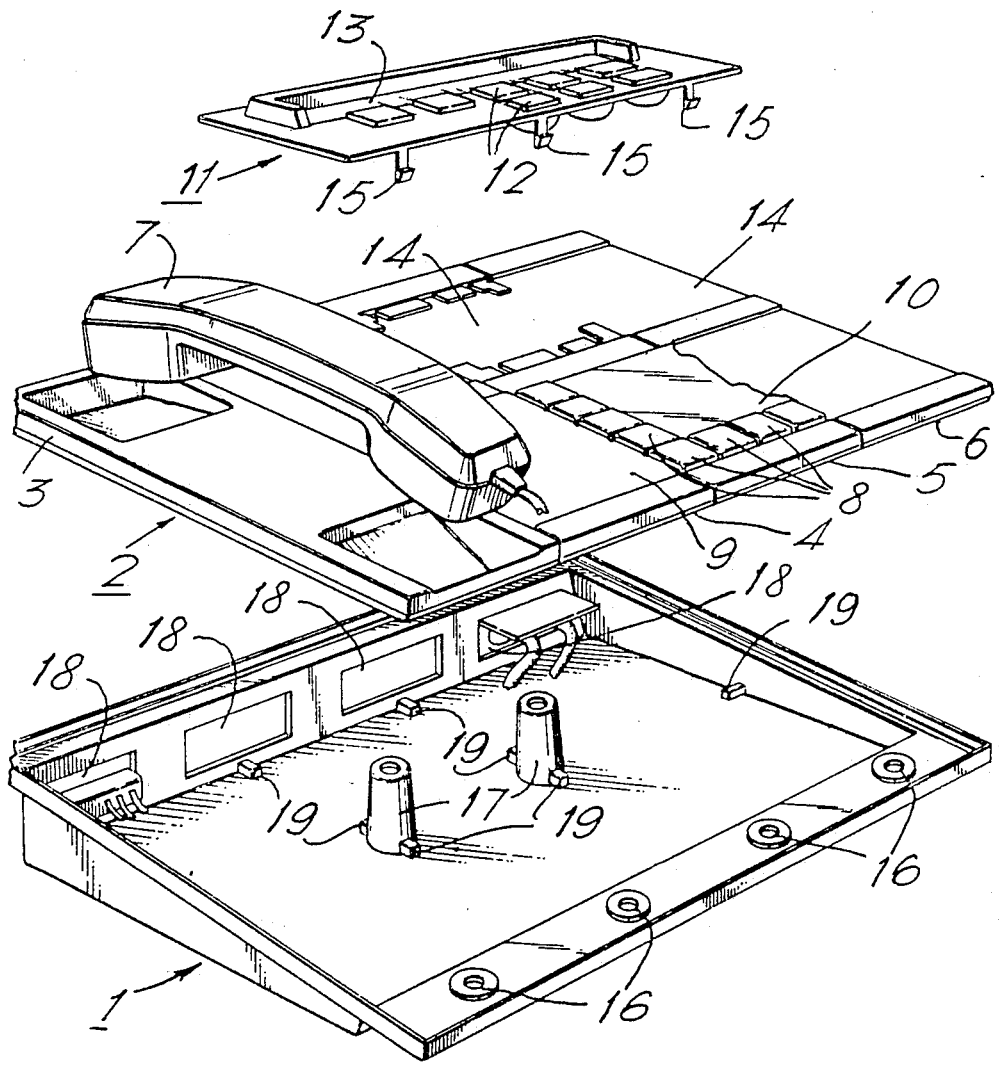
FIG. 1 shows an exploded, perspective view of a telephone instrument housing according to the invention.

FIG. 1 shows an exploded perspective view of a telephone instrument housing according to the invention, the telephone instrument having a housing comprising a first section 1 in the form of a base section and a second section 2 in the form of a top section. The top section 2 is constructed from four sub-sections 3,4,5 and 6, sub-sections 4,5 and 6 being identical to each other. The sub-section 3 is different from the other sub-sections and is designed to locate a handset 7. The sub-sections 4,5 and 6 are shown in greater detail in FIGS. 2 and 3 and will be further described hereinafter. Depending on the facilities to be provided by the telephone instrument a greater or lesser number of the sub-sections 4, 5 and 6 are provided while only one sub-section 3 per instrument is used. It is, alternatively, possible to dispense with the sub-section 3 and mount the handset 7 on a hook switch projecting from the side of the base section 1.

The sub-sections 4, 5 and 6 carry a selected arrangement of pushbuttons 8, and cover plates 9 and 10 which may be blank or may be provided with legends. A further sub-assembly 11 carrying pushbuttons 12 and a display device 13 is mounted on the sub-sections 4,5 and 6 by means of barbs 15 which engage with the apertures 14 in the sub-sections.

The rear of the base section 1 is provided with a plurality of cut outs 18 through which cable entry may be effected. The cut outs may have plugs and/or sockets mounted in them or be covered by blanking plates depending on cable entry requirements. Telephone and data circuits and components may be mounted on printed circuit boards located by projections 19.

FIG. 2 shows a plan view of a sub-section 20 suitable for use as the sub-sections 4,5 and 6 of FIG. 1. The sub-section 20 comprises a first part 21 defining a matrix of apertures 22 for locating an array of pushbuttons 23. In this instance the matrix of apertures 22 comprises four columns and five rows. These numbers are arbitary and may be changed depending on the application. As shown in FIG. 2 the pushbuttons 23 are arranged to have a minimum spacing so that there is merely sufficient clearance between them to allow independent operation. When pushbuttons are not required in every position in the matrix of apertures cover plates 24, 25 are fitted to mask those apertures 22 where a pushbutton is not required and provide a finished surface to the top of the telephone instrument. The pushbuttons and cover plates may be blank or may carry legends which may be produced in any convenient fashion, for example printing or engraving.

The first part 21 and a second part 31 are separated by a ridge 26 and two further ridges 27 and 28 are formed at each end of the sub-section and define the extents of the first part 21 and second part 31. The first part 21 is also provided with a number of display devices 30 which are located next to pushbutton positions adjacent to the ridges 26 and 27.

The second part 31 of the sub-section 20 defines an aperture 32 which extends over a major portion of the second part 31. The aperture 32 is provided with four projections 33 for co-operation with spring barbs to locate a cover plate or additional sub-assembly in the aperture 32. The aperture 32 extends over the major portion of the second part to allow access to the underside of a sub-assembly, when provided, to enable electrical connection between the sub-assembly and a printed circuit board to be made without inconvenience.

FIG. 3 is a cross-sectional view of the sub-section on line A—A of FIG. 2. The sub-section 20 is mounted on a printed circuit board 40 by means of barbs 41 which project through co-operating apertures (not shown) in the printed circuit board 40. The pushbutton tops 23 are located in the apertures 22 by means of plugs 42 which are a friction fit within the hollow stem 43 of the pushbutton tops 23 and which engage against shoulders 44 of the apertures 22 to prevent the pushbutton tops 23 being displaced from the apertures. The printed circuit board 40 is shown broken in the region of the plug 42 merely to enable the fitting of the pushbuttons to be clearly indicated and in practice the printed circuit board extends continuously. The plug 42 is biassed against the shoulder 44 by means of an elastomeric dome 455 which includes a conductive pill which short circuits tracks on the printed circuit board when the pushbutton is depressed. Only one dome is shown for reasons of clarity but all operative pushbuttons are provided with such domes. The cover plate 24 is located by means of barbs 47 which engage behind the shoulders 44 of appropriate apertures 22. The cover plate 25 is, of course, located in the same manner. The pushbutton tops are square and have a flat surface which contains a depression 50 which extends over substantially half the top surface area. As can be seen from FIG. 3 the pushbutton tops 23 can be mounted with the depression in different orientations the purpose of which will be described hereinafter.

The display devices 30 comprise a surface mounted light emitting diode 46 and a light guide 30, for example a perspex rod, which is in contact with the light emitting surface of the diode 46 at one end and whose other end provides the visual display at the top surface of the instrument.

The sub-section 20 is attached to the first or base section 1 by means of screws passing through bosses 16 and pillars 17 (FIG. 1) in the base section into threaded inserts (not shown) located in the ridges 26 and 27 of the sub-sections 20. Various additional or alternative methods of connecting the base and top sections would be readily apparent to those skilled in the art. For example horizontally extending lugs could be formed on the ridge 28 which engage in slots provided in the rear of the base section. Alternatively adhesives could be used, particularly with simple instruments where a replacement rather than repair philosophy was employed.

Figure 4:
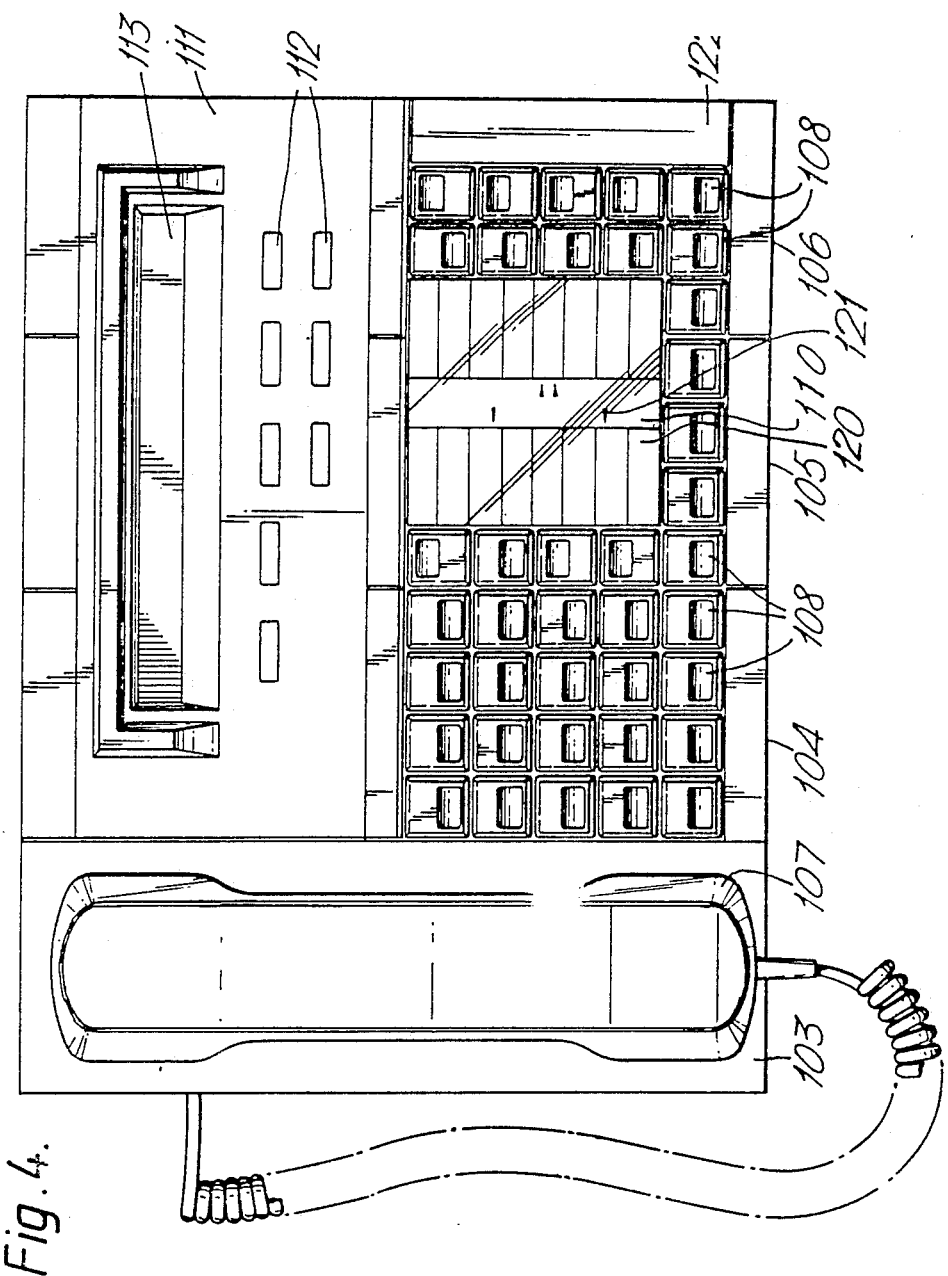
FIG. 4 is a plan view of an embodiment of a telephone instruments similar to that shown in FIG. 1.

FIG. 4 shows a plan view of a telephone instrument similar to that shown in FIG. 1. The telephone instrument shown in FIG. 4 comprises a handset 107 mounted in a handset sub-section 103 and three identical sub-sections 104, 105 and 106 which carry a plurality of pushbuttons 108, a cover plate 110 having spaces 120 thereon for writing addresses for repertory dialling or call transfer, and indicators 121 for indicating the address operated by a pushbutton depression or of a received call, a blank cover plate 122, and a further sub-assembly 111 carrying further pushbuttons 112 and a display unit 113. The pushbuttons 108 are of the same form as the pushbuttons 23 and the two columns immediately to the left of the cover plate 110 have their tops turned through 180 degrees with respect to each other. This enables the addresses written on the cover plate to be spaced at half the spacing of the pushbuttons which relate to those addresses, the depressions 50 indicating the address associated with a particular pushbutton. A similar arrangement is used in the two columns to the right of the cover plate 110 for the sample purpose.

The telephone instrument described with reference to FIG. 4 may be assembled as illustrated in FIG. 1 and use the sub-section as illustrated in FIGS. 2 and 3.

Figure 5:
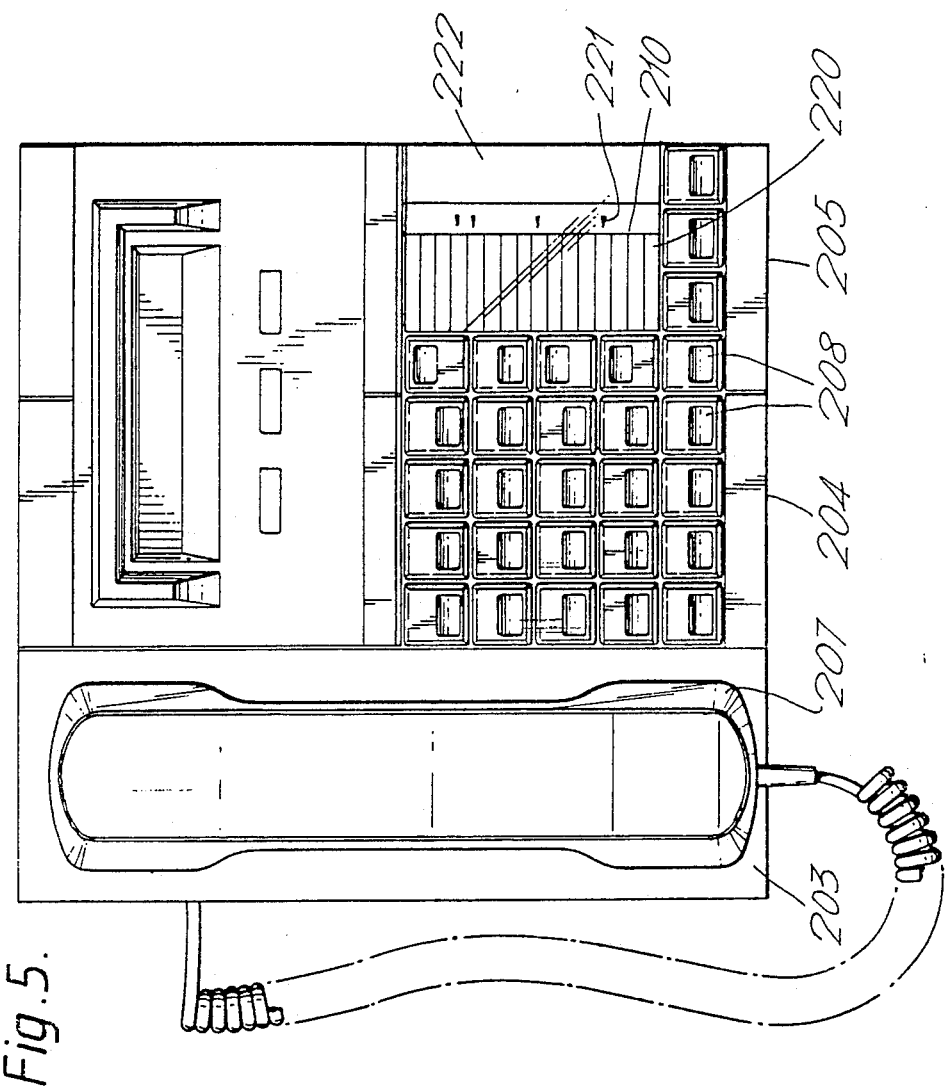
FIG. 5 is a plan view of a further embodiment of a telephone instrument according to the invention.

FIG. 5 shows a plan view of a telephone instrument having fewer facilities than that shown in FIG. 4. The instrument shown in FIG. 5 comprises a handset section 203 carrying a handset 207 and two identical sub-sections 204 and 205. The first sub-section 4 carries an array of pushbuttons 208 while the second sub-section carries a number of pushbuttons 208, a cover plate 210 which has spaces thereon for addresses 220 and indicators 221 and a plain spacer 222.

The telephone instrument shown in FIG. 5 is constructed from the same sub-sections as that shown in FIG. 4.

Figure 6:
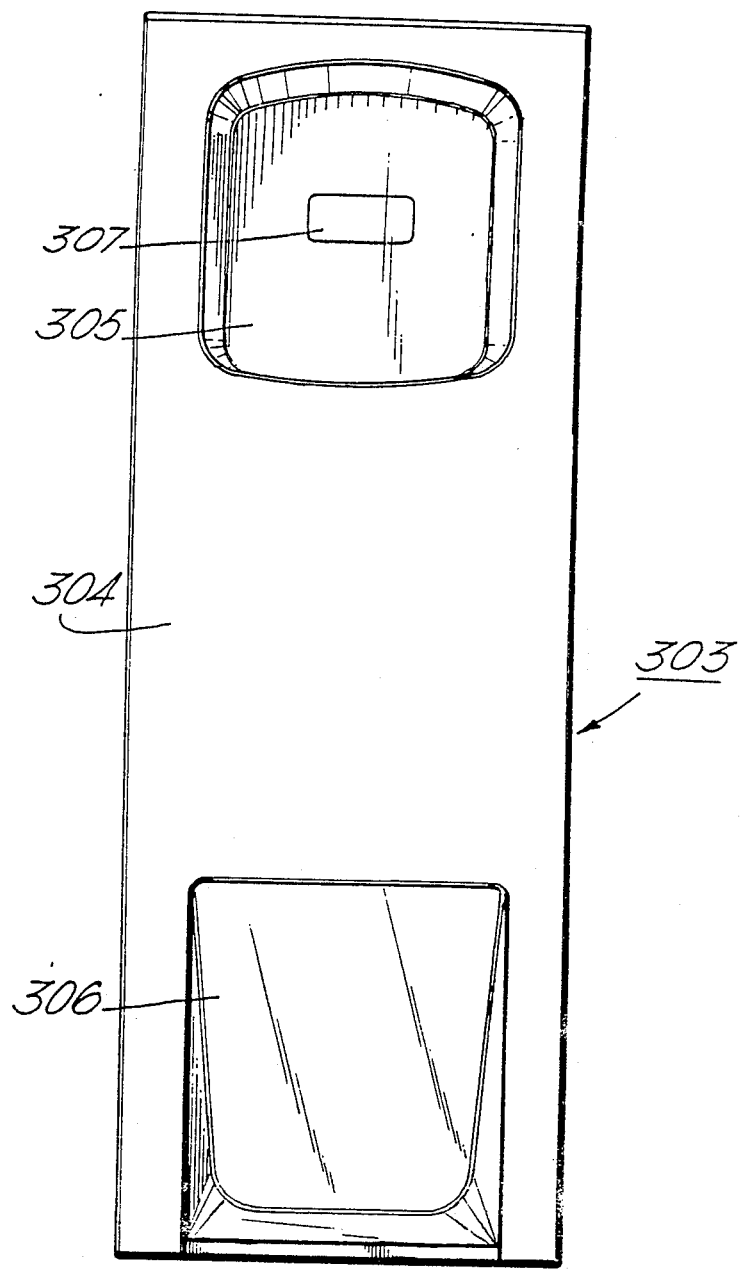
FIG. 6 shows a handset sub-section suitable for use in a telephone instrument as shown in FIGS. 1, 4 or 5.

FIG. 6 shows a plan view of a handset sub-section suitable for use in the telephone instruments shown in FIGS. 1, 4 and 5. The handset sub-section 303 comprises a rectangular plate 304 provided with two recesses 305 and 306. The recesses 305 and 306 are spaced and dimensioned to recieve the mouth and ear pieces of the telephone handset. The instruments shown are designed for desk top mounting and the handset is kept in position by gravity. However, if wall mounting was desired with the handset lying substantially vertically rather than horizontally this could be achieved by appropriate design of the shape of the mouth or ear piece and the recesses. The recess 305 is provided with an aperture 307 through which the hook switch projects so that it can be operated by replacing the handset on the sub-section.

Clearly many alternative arrangements using the sub-section shown in FIGS. 2 and 3 can be constructed, the layout of the cover plates and pushbuttons being variable to give a desired asthetic effect and to provide access to the facilities provided. Thus by using a sub-section provided with a regular array of apertures for locating pushbuttons and by arranging the buttons of adjacent pushbuttons to cover the area between the adjacent apertures a finished appearance can be given to a telephone instrument while allowing many different options to be offered using the same top sub-section. Clearly where single isolated pushbuttons are not required for a particular instrument the cover plate for that location could be constructed to have the same appearance as a pushbutton top.

I claim:

1. An improved telephone instrument housing having a first and a second section, the first and second sections each being rectangular in plan and being connected together to form such housing, characterized in that:
    said second section comprises a plurality of adjacent individually separable identical sub-sections rectangular in plan and butted together, the width of said second section matches the width of said first secttion which is formed in one piece, and
    a first rectangular area of each of said identical sub-sections has a rectangular array of a plurality of rows of equi-spaced apertures therein for locating a corresponding rectangular array of pushbuttons in such apertures, each such array of apertures extending across the entire width of the associated sub-section, the apertures in each such array which are adjacent the edges of the width of such first rectangular area being spaced from such edges by half the spacing between such apertures, whereby said adjoining identical sub-sections form a single contiguous array of equi-spaced pushbutton apertures extending across the entire width of the area defined thereby on said second section.

2. A telephone instrument housing as claimed in claim 1, characterised in that an array of pushbuttons is located in a plurality of the apertures in said first area of at least one of said sub-sections, the pushbuttons having heads so dimensioned that the heads of pushbuttons in adjacent apertures cover substantially all of the spacing between such apertures, leaving only sufficient clearance therebetween to allow said pushbuttons to be operated individually.

3. A telephone instrument housing as claimed in claim 2, characterised in that a cover plate covers apertures in said sub-sections in which no pushbutton is located, said cover plate being located by engaging means thereon which extend into such apertures.

4. A telephone instrument housing as claimed in claim 1, characterized in that a second rectangular area of each sub-section has a single aperture therein which extends over a major portion of such second rectangular area.

5. A telephone instrument housing as claimed in claim 4, characterized in that a sub-assembly of said housing is mounted in the aperture in said second rectangular area of at least one of said sub-sections.

6. A telephone instrument housing as claimed in claim 1, characterised in that the sub-sections are mounted on a single printed circuit board.

7. A telephone instrument housing as claimed in claim 5, characterised in that said sub-assembly is snap fitted in each of the apertures in which it is inserted.

8. A telephone instrument housing as claimed in claim 1, characterised in that each of the sub-sections of said second section are connected to the first section of said housing by means of screws.

9. A telephone instrument housing as claimed in claim 1, characterised in that the second section further comprises an additional sub-section which is rectangular in plan and adapted for locating a telephone handset thereon.

10. A telephone instrument housing as claimed in claim 9, in which said additional sub-section is of substantially the same rectangular dimensions as the other sub-sections of said second section.

* * * * *